(12) United States Patent
Blalock

(10) Patent No.: US 7,716,082 B1
(45) Date of Patent: May 11, 2010

(54) WIRELESS PAYMENT MAT DEVICE AND METHOD FOR RETAIL ENVIRONMENTS

(75) Inventor: Dolan F. Blalock, Greensboro, NC (US)

(73) Assignee: Gilbarco, Inc., Greensboro, NC (US)

( * ) Notice: Subject to any disclaimer, the term of this patent is extended or adjusted under 35 U.S.C. 154(b) by 1353 days.

(21) Appl. No.: 09/645,389

(22) Filed: Aug. 24, 2000

(51) Int. Cl.
*G06Q 20/00* (2006.01)
(52) U.S. Cl. ............................... 705/17; 705/16; 705/18
(58) Field of Classification Search ............... 705/17, 705/16, 18, 14, 23, 24, 39, 40; 235/383, 235/375; 186/59
See application file for complete search history.

(56) References Cited

U.S. PATENT DOCUMENTS

| | | | | |
|---|---|---|---|---|
| 4,115,870 A | * | 9/1978 | Lowell | 379/93.17 |
| 4,723,212 A | | 2/1988 | Mindrum et al. | 364/401 |
| 4,788,420 A | * | 11/1988 | Chang et al. | 235/483 |
| 4,870,391 A | | 9/1989 | Cooper | 340/572 |
| 4,910,672 A | | 3/1990 | Off et al. | 364/405 |
| 5,173,851 A | | 12/1992 | Off et al. | 364/401 |
| 5,180,905 A | * | 1/1993 | Chen et al. | 235/483 |
| D333,658 S | * | 3/1993 | Sasaki | D18/4.6 |
| 5,228,084 A | | 7/1993 | Johnson et al. | 380/23 |
| 5,241,163 A | | 8/1993 | Vachtsevanos et al. | 235/449 |
| 5,266,789 A | * | 11/1993 | Anglin et al. | 235/483 |
| 5,315,187 A | | 5/1994 | Cheng | 307/542.1 |
| 5,384,850 A | * | 1/1995 | Johnson et al. | 380/52 |
| 5,386,106 A | * | 1/1995 | Kumar | 235/380 |
| 5,448,348 A | | 9/1995 | Azeta | 355/319 |
| 5,485,520 A | | 1/1996 | Chaum et al. | 380/24 |
| 5,539,193 A | * | 7/1996 | Gibbs et al. | 235/472.02 |
| 5,585,953 A | | 12/1996 | Zavrel | 359/152 |
| 5,612,868 A | | 3/1997 | Off et al. | 364/214 |
| 5,617,343 A | * | 4/1997 | Danielson et al. | 709/245 |
| 5,631,832 A | | 5/1997 | Hagenbuch | 364/424.04 |
| 5,640,002 A | * | 6/1997 | Ruppert et al. | 235/462.46 |
| 5,661,457 A | | 8/1997 | Ghaffari et al. | 340/572 |
| 5,708,423 A | | 1/1998 | Ghaffari et al. | 840/825.35 |
| 5,805,416 A | * | 9/1998 | Friend et al. | 361/686 |
| 5,808,283 A | * | 9/1998 | Stanton et al. | 235/441 |
| 5,813,748 A | * | 9/1998 | Maxymych | 362/154 |

(Continued)

FOREIGN PATENT DOCUMENTS

EP 0 933 733 A 8/1999

(Continued)

*Primary Examiner*—F. Zeender
*Assistant Examiner*—Christopher Buchanan
(74) *Attorney, Agent, or Firm*—Nelson Mullins Riley & Scarborough LLP

(57) ABSTRACT

The present invention relates to a payment mat that wirelessly communicates with a payment device for payment of items, such as goods and/or services, in a retail environment. A customer presents the payment device within the radiation range of an antenna contained in the payment mat for payment. The payment mat may also include a visual indicator, audio indicator, keypad, transaction display, advertising display, receipt printer, and transaction card reader. The payment mat may be constructed out of a rigid or flexible material. The payment mat may be placed flat on counters in retail stores, nearby cash registers or order entry devices. The payment mat may be placed on drive-thru windows in retail environment, such as quick service restaurants (QSR) or pharmaceutical stores. The payment mat may be placed behind a secure order entry window.

40 Claims, 11 Drawing Sheets

U.S. PATENT DOCUMENTS

| | | | |
|---|---|---|---|
| 5,819,234 A | 10/1998 | Slavin et al. | 705/13 |
| 5,832,457 A | 11/1998 | O'Brien et al. | 705/14 |
| 5,926,795 A | 7/1999 | Williams | 705/14 |
| 5,933,812 A * | 8/1999 | Meyer et al. | 705/15 |
| 5,966,696 A * | 10/1999 | Giraud | 705/14 |
| 5,969,968 A | 10/1999 | Pentel | 364/405 |
| 5,974,399 A | 10/1999 | Giuliani et al. | 705/14 |
| 5,987,155 A | 11/1999 | Dunn et al. | 382/116 |
| 6,022,599 A * | 2/2000 | Rietveld et al. | 428/14 |
| 6,026,370 A | 2/2000 | Jermyn | 705/14 |
| 6,026,868 A * | 2/2000 | Johnson, Jr. | 141/94 |
| 6,032,127 A | 2/2000 | Schkolnick et al. | 705/23 |
| 6,042,007 A * | 3/2000 | Nugent et al. | 235/383 |
| 6,049,813 A | 4/2000 | Danielson et al. | 708/100 |
| 6,062,473 A | 5/2000 | Blalock et al. | 235/381 |
| 6,073,840 A * | 6/2000 | Marion | 235/381 |
| 6,078,259 A | 6/2000 | Brady et al. | 340/572.7 |
| 6,078,888 A * | 6/2000 | Johnson, Jr. | 705/1 |
| 6,088,680 A | 7/2000 | Hoshino et al. | 705/13 |
| 6,097,606 A * | 8/2000 | Groves et al. | 361/747 |
| 6,098,055 A | 8/2000 | Watanabe | 705/73 |
| 6,098,879 A | 8/2000 | Terranova | 235/384 |
| 6,193,152 B1 * | 2/2001 | Fernando et al. | 235/380 |
| 6,266,685 B1 * | 7/2001 | Danielson et al. | 708/141 |
| 6,282,088 B1 * | 8/2001 | Canova et al. | 361/686 |
| 6,283,777 B1 * | 9/2001 | Canova et al. | 439/218 |
| 6,408,279 B1 * | 6/2002 | Mason | 705/16 |
| 6,426,868 B1 * | 7/2002 | Fullerton | 361/680 |
| 6,711,474 B1 * | 3/2004 | Treyz et al. | 701/1 |

FOREIGN PATENT DOCUMENTS

| | | |
|---|---|---|
| EP | 0 949 593 A | 10/1999 |
| EP | 0 965 939 A | 12/1999 |
| WO | WO 96 21191 A | 7/1996 |
| WO | WO 97/24689 A1 * | 7/1997 |
| WO | WO 98 52164 A | 11/1998 |
| WO | WO 98 58509 A | 12/1998 |
| WO | WO 98 58510 A | 12/1998 |
| WO | WO 99 12136 A | 3/1999 |
| WO | WO 99 53449 A | 10/1999 |

* cited by examiner

WIRELESS PAYMENT MAT DEVICE AND METHOD FOR RETAIL ENVIRONMENTS

FIELD OF THE INVENTION

The present invention relates to a payment mat that wirelessly communicates with a payment device for payment of items, such as goods and/or services, in a retail environment.

BACKGROUND OF THE INVENTION

Most retail environments accept cash and credit or debit cards for customer payment of goods or services. Cash transactions require an attendant to make and give change, thereby slowing down throughput of customers. This may be particularly important in retail stores that have heavy customer traffic. Cash transactions also require retail stores to carefully account for such cash to minimize theft, such as counting and making manual deposits into banks. Such deposits often occur in unsafe conditions at night, after the retail store is closed and the cash on-hand is collected and counted.

Credit and debit transaction cards have increased payment speeds over the use of cash, but use of such transaction cards can cause timing delays in their own right. Customers have to reach into their purse or wallet to find their transaction card. Sometimes, magnetic card stripes loose their information requiring the attendant to manually enter the card number and expiration date. Often, transaction card authorization requires communication to a remote host network, taking additional time to receive authorization.

Wireless payment systems, using transponders or other wireless payment devices, such as RFID, have been developed to improve the payment speeds for retail transactions. A wireless payment device may contain an ID that uniquely identifies a customer to the customer's account. The wireless payment device may contain resident memory with storage of a cash balance from which payment can be subtracted. However, use of such wireless payment systems requires communication readers, comprised of electronics and an antenna, for wirelessly communicating with wireless payment devices used by customers for payment. Such communication readers should be located where customers tender payment for purchases. Such communication electronics can be cumbersome to install given the limited amount of space in retail store environments. For instance, quick service restaurants (QSR) have cash registers positioned close together with a minimal amount of space between each. Many of these same QSRs have "drive-thru" window pickups that also have counters with limited space. The counters within restaurants should be clear to allow an attendant to deliver food and other items to the customer. Convenience store counters also have limited space since they often contain cash registers and other goods for sale to customers.

Therefore, a need exists to provide communication readers that are conveniently located and accessible to customers using wireless payment devices for payment and do not occupy large amounts of space on or proximate to the retail counter.

SUMMARY OF THE INVENTION

The present invention relates to a payment mat in retail stores and environments. A customer presents a payment device to the payment mat. The payment device is capable of wirelessly communicating with the payment mat for satisfactory payment for items, including all goods and/or services.

In one embodiment, the payment mat includes an antenna. An interrogation reader, which may be remote from the payment mat but coupled to the antenna, or is contained inside the payment mat, drives the antenna to radiate communications to payment devices presented by customers. The antenna may be a coil and may be helical in shape. The antenna may be included on a printed circuit board, or printed onto a material with conductive ink. The antenna may include a plurality of antenna for communication at different frequencies. The interrogation reader may communicate through the antenna at different protocols.

The payment mat may be constructed out of a rigid or flexible material. The payment mat may be sealed to protect it from outdoor environments. The payment mat may have a skid resistant surface on one side so that the payment mat does not move around easily when placed on a flat surface.

In another embodiment, the payment mat includes an audio indicator. The visual indicator may alert the customer that the payment device is in range of the antenna for communication, but the present invention is not limited to such use.

In another embodiment, the payment may includes an audio indicator. The audio indicator may alert the customer, especially a visually impaired customer, that the payment device is in the range of the antenna for communication. The audio indicator may also be used for advertising or music. The audio indicator, however, is not limited to such uses.

In another embodiment, the payment mat includes a card reader for when a customer wishes to pay for transactions with a transaction card, such as a credit card, debit card, or bar code card. The card reader 112 may also be used as a authentication tool.

In another embodiment, the payment mat includes a biometric reader for authentication purposes or for payment.

In another embodiment, the payment mat includes a transaction display. The transaction display may give prompts to customers, or may be used to display items for sale. The transaction display may be used to show the purchase price of items selected or ordered by the customer.

In another embodiment, the payment mat includes an advertising display. The advertising display may display advertising or other messages to a customer. The advertising display may be constructed out of a transparent material, such as clear plastic or glass, so that paper advertisements can be inserted and removed as desired.

In another embodiment, the payment mat includes a keypad. The keypad may be used for allowing a customer to make selections. The keypad may also be used to allow a customer to enter in a code, such as a PIN, for use with transaction cards, such as debit cards. The payment mat may include encryption circuitry to encrypt inputs on the keypad.

In another embodiment, the payment mat includes a receipt printer. The receipt printer may be used to print a receipt of the transaction to the customer. The receipt printer may also be used to print a code, coupon or other message for use by the customer.

In another embodiment, the customer pays for items by presenting a payment device to the payment mat and antenna. The interrogation reader in the payment mat interrogates the identification from the payment device and correlates such identification to the customer's account for billing.

In another embodiment, the payment device has a cash balance stored in memory. The payment mat and interrogation reader subtracts from this cash balance when purchases are made, if enough cash balance is present to cover the purchase price.

In another embodiment, the payment mat is placed flat on the counter of a retail store area. Multiple payment mats may be located in between cash registers or order entry devices for reading payment devices presented by customers for payment.

In another embodiment, the payment mat is placed proximate to a drive-thru window. In one embodiment, the payment mat is placed on the right side of the window. In another embodiment, the payment mat is placed on the left side of the window. In another embodiment, the payment mat is placed on the top of the window. In another embodiment, the payment mat is placed on the bottom of the window. The payment mat may be connected to the window through use of a hinge. The hinge may move in one direction so that the payment mat is capable of moving if hit by a customer or vehicle.

In another embodiment, the payment mat is placed vertically on a secure order entry window, whereby a customer is on one side and an attendant is on another side. Customers present payment devices for payment through the window.

DETAILED DESCRIPTION OF THE INVENTION

The present invention relates to a payment mat used for wireless interrogation of a payment device for payment of items in a retail environment. The term "items" as used herein, includes goods and/or services sold through a retail establishment or store.

Payment Mat

Figure 1:
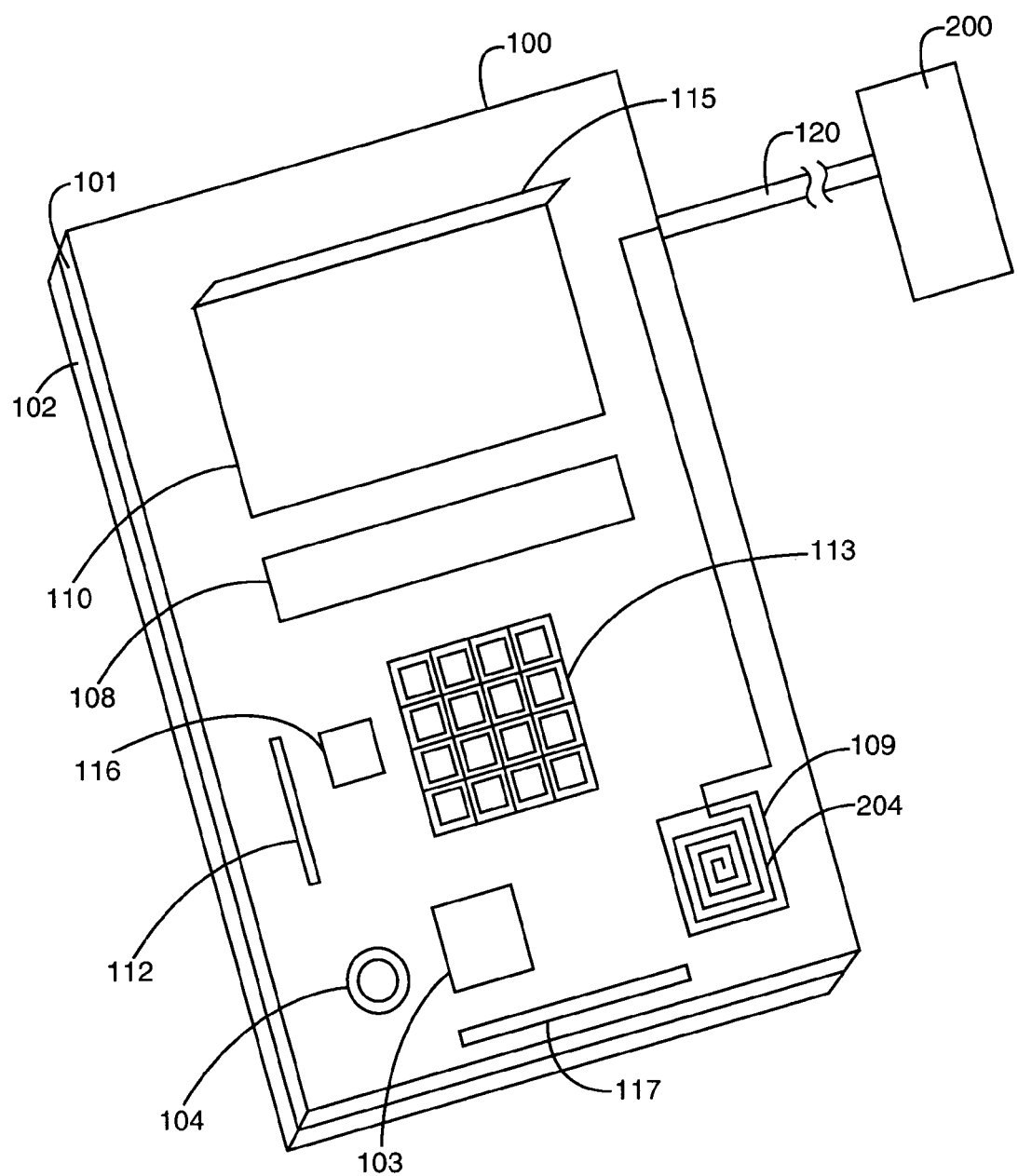
FIG. 1 is a schematic diagram of a payment mat.

FIG. 1 illustrates one embodiment of the payment mat 100. The payment mat 100, in its most basic form, contains an antenna 204. However, the payment mat 100 may include other elements and functionalities, as discussed below. The payment mat 100 has a front and back side and may be constructed out of a variety of materials. The payment mat 100 is particularly useful for placement in retail environments where space is limited, since the payment mat 100 is thin while still providing a large surface for interacting with a customer in a retail environment. The advantages of this payment mat 100 design in retail environments is discussed later below in the section entitled "Placement of Payment Mat."

Figure 2:
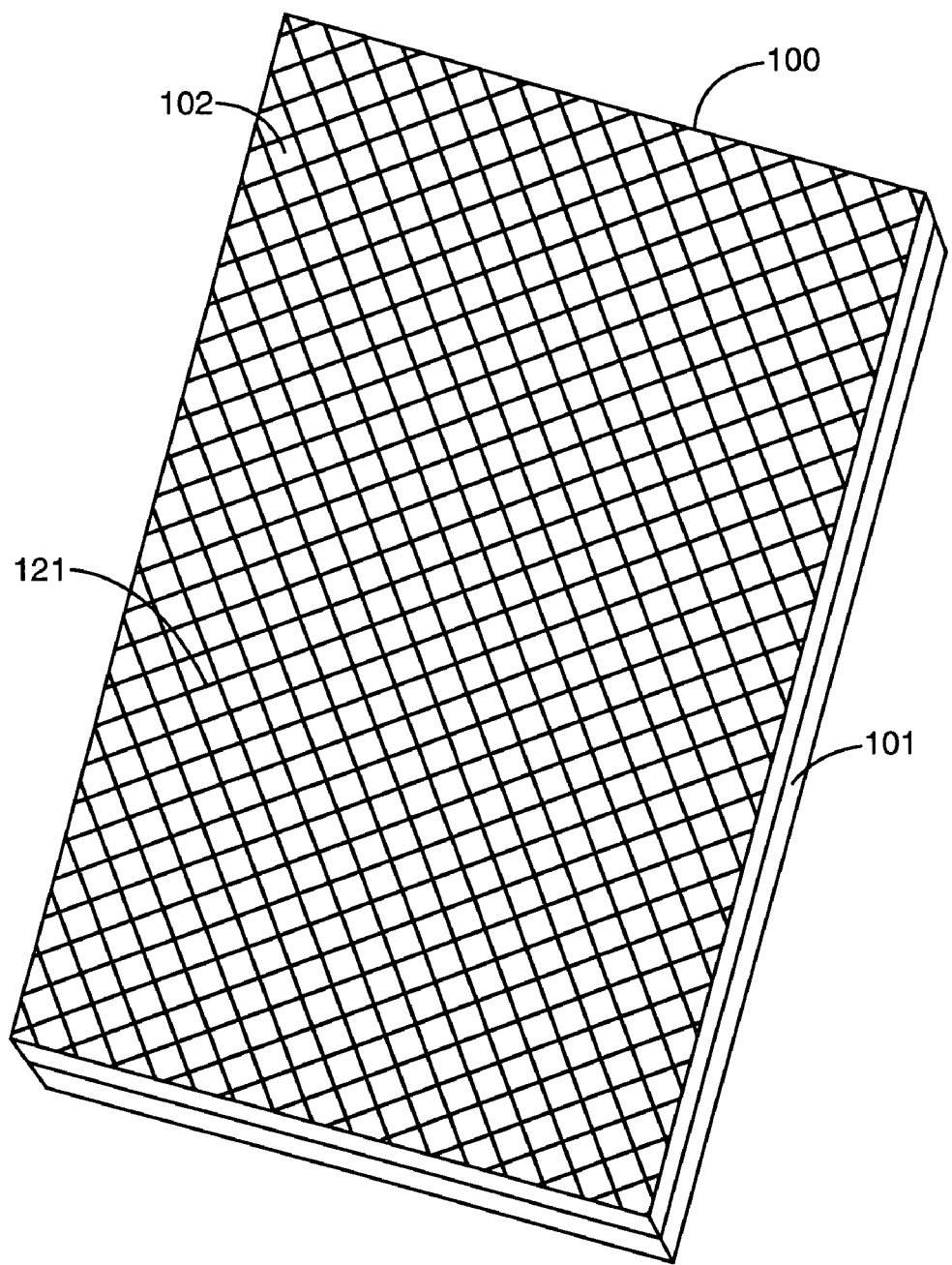
FIG. 2 is a schematic diagram of the lower portion of a payment mat having a skid resistant surface.

The payment mat 100 may be comprised of one contiguous piece of material, or may be comprised of an upper portion 101 and lower portion 102 that are sealed together as illustrated in FIG. 2. Use of a separate upper portion 101 and lower portion 102 may be advantageous so that internal components can be placed inside the payment mat 100 during manufacture. The payment mat 100 may also be constructed out of a material that is weather resistant or weather-proof if placed in outdoor retail environments. If the payment mat 100 is constructed out of an upper portion 101 and lower portion 102, a seal is provided between the portions that is weather resistant or weather-proof for the payment mat 100 to be weather resistant or weather-proof.

The payment mat 100 may contain a control system (not shown) other electronics and/or software that control a variety of functions and peripherals contained in the payment mat 100, as discussed below. It will be readily known to one of ordinary skill in the art how to implement such a control system, using electronics, or a micro-controller or microprocessor system, to control, access and communication with a variety of electronic peripherals.

An antenna 204 is associated within the payment mat 100 for wireless communication with customers. The antenna 204 may be internal to the payment mat 100, or may be placed on the external surface of the payment mat 100. The antenna 204 may have a variety of orientations, such as the shape of a coil or helical coil 109. Antenna 204 may be constructed out of a conductive metal or may be a printed conductive material on a printed circuit board (PCB), such as printed silver ink. If the antenna 204 is placed on a PCB, it may be desirable to use a flexible PCB if the payment mat 100 is flexible. The larger the PCB, the more flexible it should be to maintain the flexibility of the payment mat 100. The antenna 204 may also be designed to operate at different frequencies. This may require multiple antennas 204 to be associated with the payment mat 100. An interrogation reader 200, discussed below under the section entitled "Wireless Communication," is coupled to the antenna 204 through a cable wire 120 or some other type of coupling, such as infrared, radio-frequency or optical coupling, to drive the antenna 204. Alternatively, the interrogation reader 200 may be contained inside the payment mat 100.

A visual indicator 103 may also be contained within the payment mat 100. The visual indicator 103 is a luminescent element that is visible to the human eye. Examples of visual indicators 103 include a light emitting diode (LED), liquid crystal display (LCD) shutter, light bulb, electro-luminescence panel, and flat-panel LCD, but the present invention is not limited to any particular type of luminescent element. One purpose of the visual indicator 103 is to indicate that a customer's payment device is in range of the antenna 204 for interrogation. The visual indicator 103 may be placed proximate to or in the same location as the antenna 204, so that the customer can see where to place his or her payment device for interrogation. However, the visual indicator 103 may be used for any purpose where it is necessary to get a customer's attention during a retail transaction.

The payment mat 100 may also contain an audio indicator 104. One purpose of the audio indicator 104 is to indicate that a customer's payment device is in range of the antenna 204 for interrogation. The audio indicator 104 may be placed anywhere on the payment mat 100 so long as the sound can reach the customer. The audio indicator 104 may be placed proximate to or in the same location as the antenna 204 to help a visually impaired individual find where to place the payment device on the payment mat 100. The visually impaired person can hone in on the sound generated by the audio indicator 104. The audio indicator 104 may also be used to give instructions or information to the customer, such as advertising or playing of music. The audio indicator 104 may be used for any purpose where it is necessary to audibly communicate with the customer.

The payment mat 100 may also contain a card reader 112. Although the payment mat 100 is capable of receiving payment wirelessly though use of a payment device, some customers may still want to pay for transactions with a card, such as a credit or debit card. The card reader 112 may also be used to verify a particular customer with a payment device presented to the payment mat 100 for payment. In this manner, the customer should have a secondary authenticating card when using a payment device for payment. The card reader 112 may be any type of card reader, such as a magnetic stripe card reader, or a bar code reader, as described in U.S. Pat. No. 6,062,473, entitled "Energy dispensing system having a bar code scanning unit," incorporated herein by reference in its entirety. The card reader may also be used for other purposes such as identification of the customer or for loyalty points given to a customer as described in U.S. Pat. No. 6,098,879, entitled "Fuel dispensing system providing customer preferences," incorporated herein by reference in its entirety.

The payment mat 100 may also contain a biometric reader 116. The biometric reader 116 may be used for payment purposes, like described above for card reader 112, and as described in U.S. Pat. No. 5,987,155, entitled "Biometric input device with peripheral port," incorporated herein by reference in its entirety. The biometric reader 116 may also be used as an authenticator of a particular customer's payment device. In this manner, a customer using a payment device would also be required to provide biometric input into the biometric reader 116 to authenticate that the payment device presented for payment is authorized for use by the particular customer. The biometric reader 116 may be for reading finger and/or thumb prints, or may be used to read retinal scans of human eyes, but the present invention is not limited to these particular human biometrics.

The payment mat 100 may also contain a transaction display 108. The transaction display 108 may be any type of display, such as a liquid crystal display (LCD), both Passive Matrix (PMLCD) and Active Matrix (AMLCD)—including Thin-Film Transistor (TFT-LCD), Diode Matrix, Metal-Insulator Metal (MIM), Active-Addressed LCD, Plasma-Addressed Liquid Crystal (PALC), or Ferroelectric Liquid Crystal Display (FLCD). Alternatively, the transaction display 108 may comprise Plasma Display Panel (PDP), Electroluminescent Display (EL), Field Emission Display (FED), Vacuum Fluorescent Displays (VFD), Digital Micromirror Devices (DMD), Light Emitting Diodes (LED), Electrochromic Display, Light Emitting Polymers, video display (cathode ray tube or projection), holographic projection, etc., but the present invention in not limited to any particular type of transaction display 108.

The transaction display 108 may contain the payment due during a retail transaction, so that a customer can visually see the amount of the transaction. The transaction display 108 may also be used to give prompts or instructions to the customer, or display other items for sale or display advertising. The transaction display 108 may also be used to prompt the customer for purchase of suggested additional items not originally selected by the customer. Such suggested items may or may not be related to the items originally selected by the customer. For instance, suggested items can be displayed that are competitive to the items originally selected by the customer. In addition, the transaction display 108 may display notices of discounted items or discounts if the customer purchases additional items. For instance, a discount may be given if the total amount of the order exceeds a threshold amount. If such threshold amount is $25.00, and the customer's total order is $22.50, the transaction display 108 could indicate that the customer will receive a 10% discount if he or she places an order for another item that is at least $2.50 or more.

The payment mat 100 may also contain an advertising display 110. The advertising display 110 displays information to the customer in the form of an advertisement or message. The advertisement may be a company logo or brand symbol. The advertisement may be information concerning a sale regarding a specific item available for purchase. The advertisement may be permanently affixed to the payment mat 100, or may be attached such that they can be removed and replaced. The advertising display 110 may be constructed out of a transparent material, such as clear plastic or plexiglass. In this manner, advertisements or other messages can be placed inside the payment mat 100 by placing such advertisements or messages into a slit 115 in the advertising display 110.

The payment mat 100 may also contain a keypad 113. The keypad 113 may be particularly useful for the customer to enter a personal identification number (PIN) if using a debit card for payment. The PIN number is used as a measure of security. The keypad 113 may include additional circuitry and/or software to encrypt entries made by the customer, similar to that described in U.S. Pat. Nos. 5,448,348; 5,384,850; and 5,228,084, each entitled "Security apparatus and system for retail environments," all incorporated herein by reference in their entirety. The keypad 113 may also be used for the customer to make order selections displayed on the advertising display 110 or transaction display 108. The keypad 113 allows the customer to input information for any variety of purposes.

The payment mat 100 may also contain a receipt printer 117 to give the customer an accounting of the transaction, including the customer's purchase. The receipt printer 117 may also be useful, if the customer is purchasing an item that is a service to be given remotely from the payment mat 100, for verification of payment. For instance, the customer may desire to purchase a car wash for a vehicle. After the customer pays for the car wash, the receipt printer 117 may print a receipt with a coupon, code, or other authorization information. This authorization information can then be presented at a later time to receive such service. For example, a code may be printed on the receipt and punched into a car wash. The payment mat 100 would be coupled to a car wash controller, and perhaps through a site controller, so that the car wash controller is aware that the code given to the customer is authorized.

The receipt printer 117 may also be useful for printing coupons. Such coupons may be non-specific, or may be in response to a particular item purchased by the customer. The coupon may be for an item that is competitive to an item purchase by the customer, such as described in U.S. Pat. Nos. 6,026,370; 5,974,399; 5,926,795; 5,832,457; 5,612,868; 5,173,851; 4,910,672; and 4,723,212, entitled "Method and apparatus for generating purchase incentive mailing based on prior purchase history," "Method and apparatus for generating purchase incentives based on price differentials," "System and apparatus for dispensing coupons having selectively printed borders around preferred products," "Method and apparatus for selective distribution of discount coupons based on prior customer behavior," "Method and apparatus for dispensing discount coupons," "Method and apparatus for dispensing discount coupons in response to the purchase of one or more products," "Method and apparatus for dispensing discount coupons," and "Method and apparatus for dispensing discount coupons," respectively, all of which are incorporated herein by reference in their entirety.

In one embodiment, the payment mat 100 is constructed out of a rigid material such as plastic, metal, wood, marble or hard foam. However, the present invention is not limited to these specific types of rigid materials. The payment mat 100 may operate best if constructed out of a rigid material. If the payment mat 100 is placed in a retail environment in a vertical direction, with an edge positioned downward, the payment mat 100 may be less susceptible to bending and contorting in shape during use. In another embodiment, the payment mat 100 is constructed out of a flexible material that may or may not be resilient. Examples of flexible material include plastic, cellular rubber, and foam, but the present invention is not limited to these specific types of materials.

FIG. 2 illustrates a payment mat 100 that is skid resistant, if placing the payment mat 100 on a surface where the lower portion 102 rests on such surface. The lower portion 102 of the payment mat 100 has a skid resistant surface 121, for placement of the payment mat 100 on surfaces in which the friction between the payment mat 100 and the surface is too small to keep skidding from occurring. Alternatively, the skid resistant surface 121 may be comprised of etchings in cross-over directions on the lower portion 102, as illustrated in FIG. 2. Or the skid resistant surface 102 may be a separate material, such a rubber or other materials having a higher coefficient of friction that is placed onto the lower portion 102. In any case, it is necessary to ensure that the skid resistant surface 121 has substantial friction when placed on the desired surface in order to prevent skidding or movement of the payment mat 100. If the payment mat 100 is constructed out of a single portion, not having a separate upper portion 101 and lower portion 102, the skid resistant surface 121 may be placed on the side of the payment mat 100 that will not be displayed or visible to the customer or user of the payment mat 100.

Wireless Communication

Figure 3:
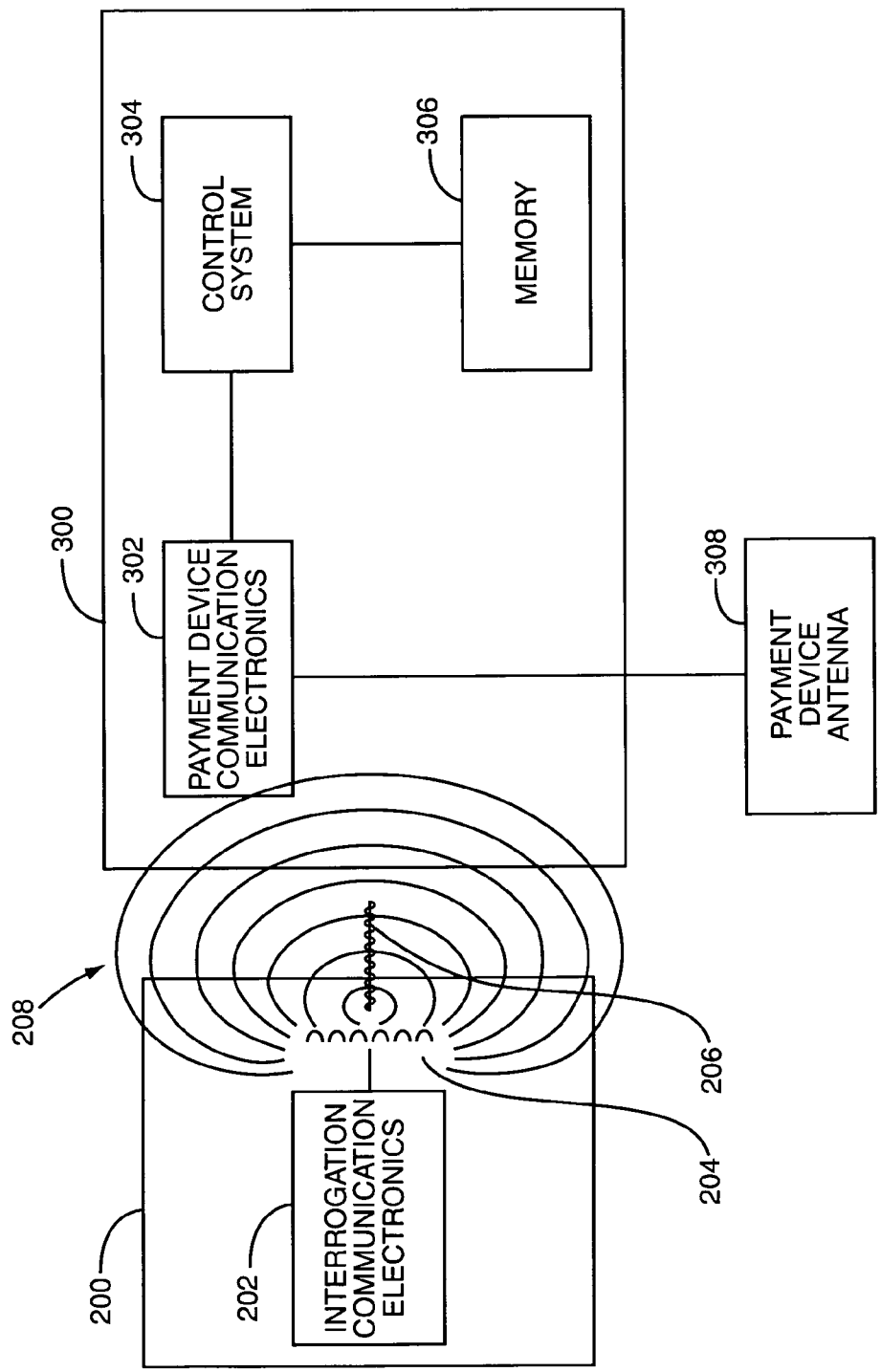
FIG. 3 is a schematic diagram of payment device and interrogation reader for wireless interrogation of the payment device.

FIG. 3 illustrates one particular type of payment device 300, called a radio frequency identification (RFID) tag. The payment device 300 may be a Smartcard, transponder, or other device 300 is capable of communicating wirelessly with an interrogation reader 200. The payment device may either be retained by the customer for payment, or may be mounted to a device associated with a customer. For example, a payment device can be mounted on a vehicle. The customer uses the payment device to pay for items when going through a drive-thru window, discussed below. One of ordinary skill in the art will understand that there are many other different types of wireless payment devices that allow electronic communication, and the present invention is not limited to any one particular type.

The payment device 300 is usually made out of some type of plastic packaging, epoxy, or other material having within it a control system 304, wireless communication electronics 302, and memory 306. A payment device antenna 308 provides communication to and from the payment device 300. The payment device antenna 308 may be either external to or incorporated internally within the payment device 300 packaging.

The control system 304 is an integrated circuit, or other type of microprocessor or micro-controller electronics, that controls the substantive operations of the payment device 300. The control system 304 is connected to the payment device communication electronics 302 to communicate and receive transmissions. The control system 304 is also connected to memory 306 for storing and retrieving information, such as identification information, or other payment information.

The payment device 300 may contain its own transmitter to communicate with an interrogation reader 200, or may use backscatter reflection of the interrogation reader field 208 to communicate with the interrogation reader 200. One example of a wireless communication device that has both transmit and receive capability, and can be used for the payment device 300, is described in U.S. Pat. No. 5,585,953, entitled "IR/RF radio transceiver and method," incorporated herein by reference in its entirety. Other wireless communication devices having receive capability and using the energy received to communicate back, such as described in U.S. Pat. No. 6,078,259 entitled "Radio frequency identification tag," incorporated herein by reference in its entirety, may be used for the payment device 300.

FIG. 3 also depicts how communication is achieved between an interrogation reader 200 and a payment device 300. An interrogation reader 200 contains interrogation communication electronics 202 and an antenna 204 (previously illustrated in FIG. 1 on the payment mat 100). The interrogation reader 200 communicates to the payment device 300 by emitting an electronic signal or command 206 modulated in a frequency through the antenna 204. The interrogation antenna 204 may be any type of antenna that can radiate a modulated signal 206 through a field 208, so that a compatible device, such as the payment device 300, can receive such signal 206 through its own payment device antenna 308. The field 208 could be any of a variety of different types used in electronic communications including electro-magnetic, magnetic, or electric, etc. The signal 206 is a message containing information and/or specific instructions for the payment device 300, such as to retrieve the payment device 300 identification or cash balance in memory 306. U.S. Pat. No. 6,073,840, entitled "Fuel dispensing and retail system providing for transponder prepayment," incorporated herein by reference in its entirety, discusses other uses and applications for a payment device 300 that are also applicable to the present invention.

When the payment device antenna 308 is in the presence of the field 208 emitted by the antenna 204, the payment device communication electronics 302 are energized thereby energizing the payment device 300. The payment device 300 remains energized so long as the payment device antenna 308 is in the field 208. The payment device communication electronics 302 demodulate the signal 206 and send the message containing information and/or specific instructions to the control system 302 for appropriate actions. For example, the request in the message may be for the payment device 300 to communicate its identification in memory 306 back to the interrogation reader 200 for payment purposes, so that the interrogation reader 200 can use such identification to correlate it to a customer account.

Alternative forms exist for communicating with a payment device 300, or other wireless communication device. For instance, the payment device 300 may have a transmitter (not illustrated) that can send information to the interrogation reader 200 without having to use the field 208 as the means for communication. The payment device 300 may have its own power source, such as a battery or an energy storage unit that is charged by energy when the payment device 300 is in the field 208. It is understood to one of ordinary skill in the art that there are many other manners in which to communicate with a wireless communication device, including a payment device 300, and that the present invention is not limited to the particular manner described above. The payment device 300, as applicable to the present invention, can be any type of wireless communication device that allows reception of wireless, electronic communications and is able to communicate in response thereto.

Payment Operation

The payment device 300 is used by the customer for payment of items. The payment device 300 is placed within the range of the antenna 204, as previously discussed, so that information can be exchanged between the interrogation reader 200 and the payment device 300.

Figure 4:
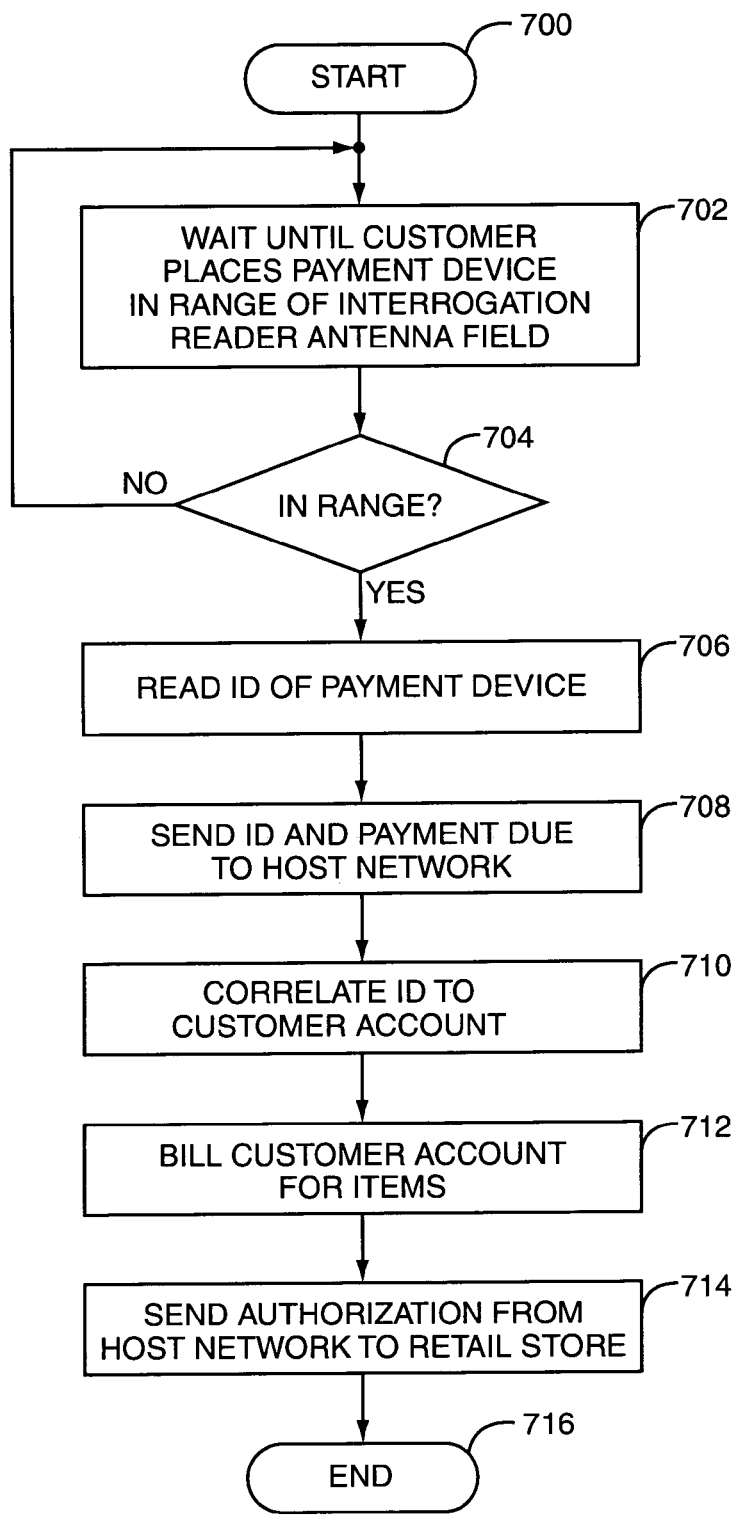
FIG. 4 illustrates a flowchart for using an identification associated with a payment device to identify a customer account for payment.

FIG. 4 illustrates a flow chart showing one possible payment system. The process starts (block 700), and the interrogation reader 200 communicates out periodically to determine if a payment device 300 is in range of the antenna 204 (block 702). The interrogation reader 200 determines when a payment device 300 is in range (block 704). If no payment device 300 is in range, the interrogation reader 200 continues to periodically communicate out to determine if a payment device 300 is in range of the antenna 204 (block 702). If a payment device 300 is in range, the interrogation reader 200 determines the identification of the payment device 300 (block 706). The interrogation reader 200 sends the identification to a host network database that may or may not be on-site near the payment mat 100 (block 708). The host network correlates the identification to a database containing an account pre-established by the customer (block 710) for billing purposes, and as described in U.S. Pat. No. 6,073,840, referenced above. If the account is present, the customer's bill is charged to the pre-established account (block 712), and an authorization is sent from the host network back to the interrogation reader 200 (block 714). The customer receives the items and the process ends (block 716).

Figure 5:
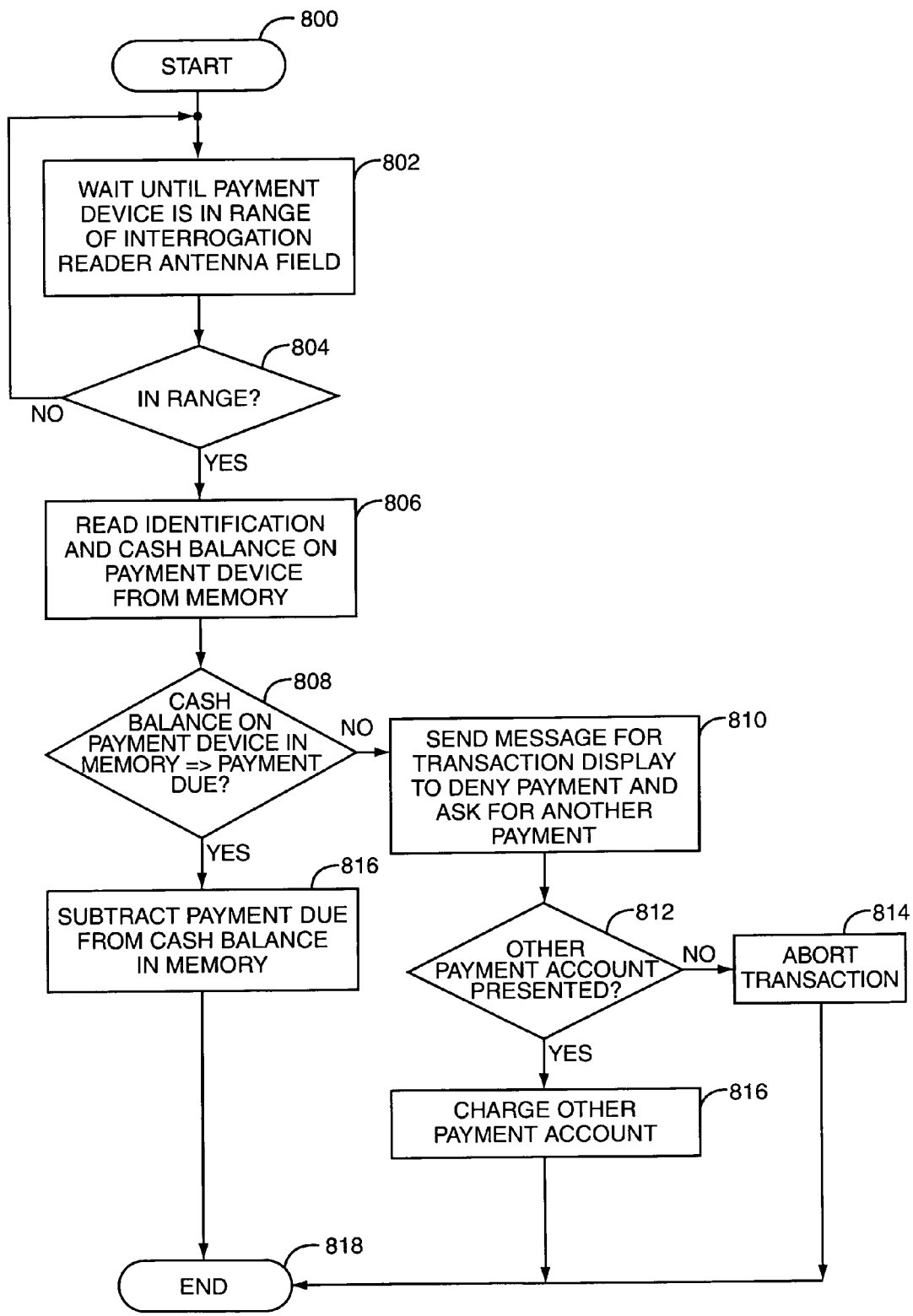
FIG. 5 illustrates a flowchart for using cash stored in memory on a payment device for payment.

Alternatively, the payment system may not use an identification from the payment device 300 to correlate a pre-established customer account. One such example of the system is described in WO 97/24689, entitled "Dispensing system and method with radio frequency customer identification," incorporated herein by reference in its entirety. FIG. 5 illustrates a flowchart where a payment device 300 having a cash account balance in memory 306 is used for purchases. The cash account is contained in a protected portion of memory 306 that can be subtracted from by any merchant, but can only be added to if authorized. One example of such as payment device 300 architecture and protocol is described in U.S. Pat. No. 6,078,888, entitled "Cryptography security for remote dispenser transactions," incorporated herein by reference. Although this reference discusses the payment device 300 in the context of a fuel dispenser transaction, such is also equally applicable to a retail environment of the present invention.

The process starts (block 800) and the interrogation reader 200 communicates out periodically to determine when a payment device 300 is in range of the antenna 204 (block 802). The interrogation reader 200 determines if a payment device 300 is in range (block 804). If no payment device 300 is in range, the interrogation reader 200 continues to periodically communicate out to determine if a payment device 300 is in range of the antenna 204 (block 802). If a payment device 300 is in range, the interrogation reader 200 determines an identification and cash balance on the payment device 300 in memory 306 (block 806). The identification may identify a bank or other financial institution that the retail merchant identifies in order to receive credit for any purchases deducted from the payment device 300. Such a system is described in U.S. Pat. No. 6,073,840, reference above. If the cash balance on the payment device 300 is greater than or equal to the transaction amount due (block 808), the interrogation reader 200 directs the payment device 300 to subtract the transaction amount from the cash balance in memory (block 816), and the process ends (block 818). If the transaction amount is less than the cash balance in memory 306, the transaction is denied (block 810). Such may be indicated verbally by an attendant, or by a message displayed on the transaction display 108 or advertisement display 110. The visual indicator 103 and/or audio indicator 104 may also be activated to indicate this state. The customer may be prompted if he or she would like to use another type payment, such as cash or transaction card, which can be inserted in the card reader 112 (block 812). If no, the transaction is aborted (block 814), and the process ends (block 818). If the customer presents another form of payment, that payment is taken, the customer is allowed to receive the items if such payment is acceptable and/or authorized (in the case of a transaction card, such as a credit card or debit card) (block 816), and the process ends (block 818).

Placement of the Payment Mat

Figure 6:
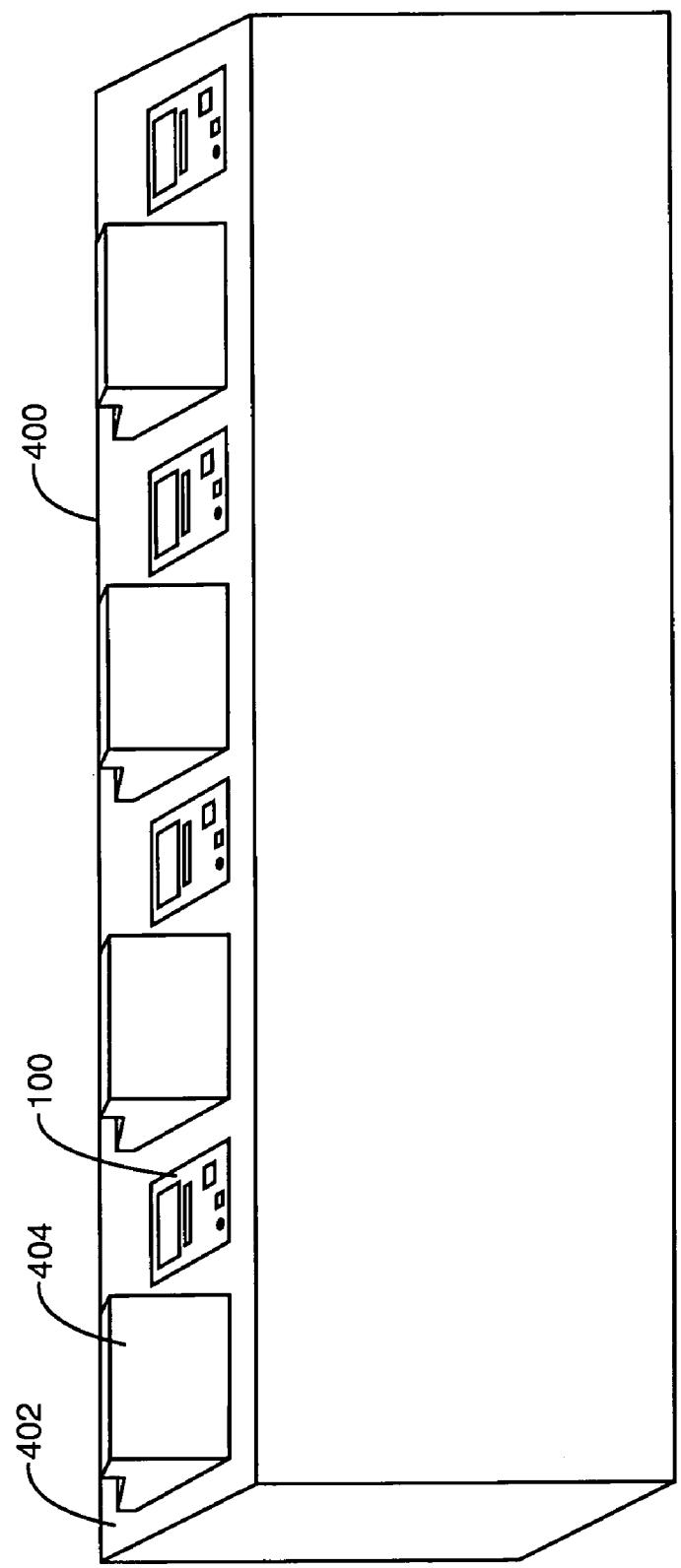
FIG. 6 is a schematic diagram of an inside retail store counter with cash registers and payment mats.

FIG. 6 illustrates a retail store area 400. The counter 402 is a surface where customers approach attendants to place and receive orders. The counter 402 usually has cash registers 404 and/or order entry systems 404 on the counter 402, in front of the customer. One advantage of the payment mat 100 being substantially flat is that it can be laid beside and in between the cash registers 404 to allow the ability of the customer to use a payment device 300 for payment of items without consuming a lot of space. Such may be advantageous, since retail counters 402 are often crowded or cluttered, thereby making it difficult to place an interrogation reader, antenna, and other display devices proximate to the cash registers 404 and/or counter 402.

If the counter 402 is constructed out of a non-conductive material, the antenna 204 usually has a read distance of about five to six inches. If the counter 402 is constructed out of steel, this may interfere with the antenna 204, causing the antenna 204 and its field 208 to have a minimal radiation distance. It is advantageous for the radiation distance of the field 208 to be at least a few inches so that it is easy for the customer to present a payment device in the field 208 interrogation. One solution is to construct the lower portion 102 of the payment mat 100 out of a non-conductive material to place a dielectric between the antenna 204 and the counter 402. Another alternative solution is to use a lower portion 102 that has a thickness sufficient enough to move the antenna 204 farther away from the counter 402, thereby reducing the interference between the counter 402 and the field 208.

Figure 7:
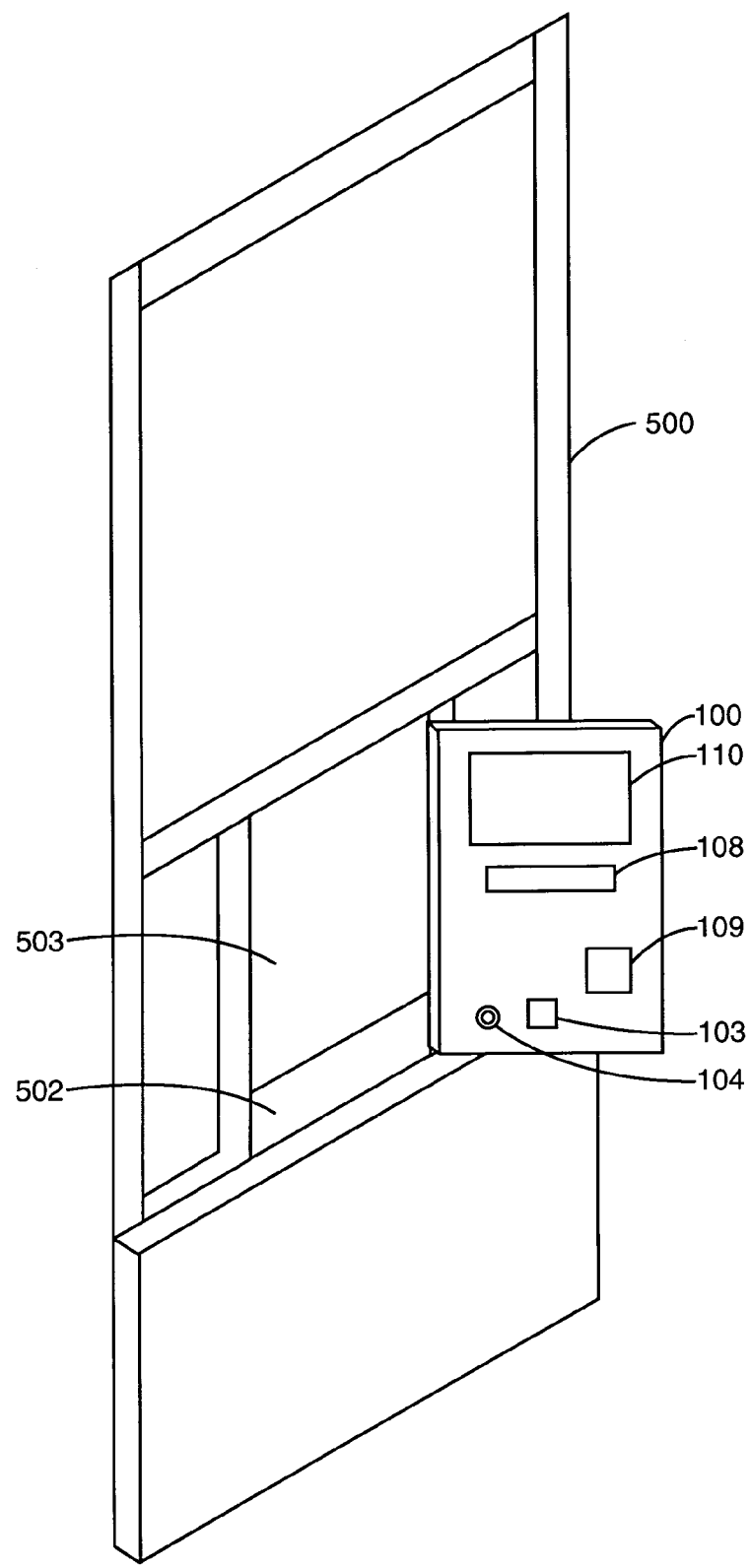
FIG. 7 is a schematic diagram of a drive-thru window having a counter and a payment mat positioned adjacent to the window.

FIG. 7 illustrates a drive-thru window 500 in a retail environment, such as a restaurant or pharmaceutical store. The drive-thru window 500 contains a window 503 that opens to allow delivery of items to the customer. The drive-thru window 500 may also contain a counter either inside the window 503, outside the window 503, or both. The payment mat 100 is place upright, with the thick portion of the payment mat 100 perpendicular to earth, and proximate to one side of the window 503, so that the customer can present a payment device 300 when arriving at the window 503 for picking up items. The payment device 300 may either be a handheld payment device 300 or may be mounted to a vehicle, as described in U.S. Pat. No. 6,026,868, entitled "Transponder distinction in a fueling environment," incorporated herein by reference in its entirety. Although this reference is used in a fueling environment, this reference is also applicable to other retail environments, including the present invention. The items may have been ordered by the customer at a menu before arriving at the window 503, or at the window 503. This particular embodiment shows the payment mat 100 connected at the left side, when viewed by the customer perspective, with a hinge (not shown) and sticking out slightly on the right side for easy viewing. The hinge also allows the right side of the payment mat 100, when viewed from the customer perspective, to bend inwards towards the drive-thru window 500, if the a customer or vehicle hits the payment mat 100, in order to minimize damage to the payment mat 100.

Figure 8:
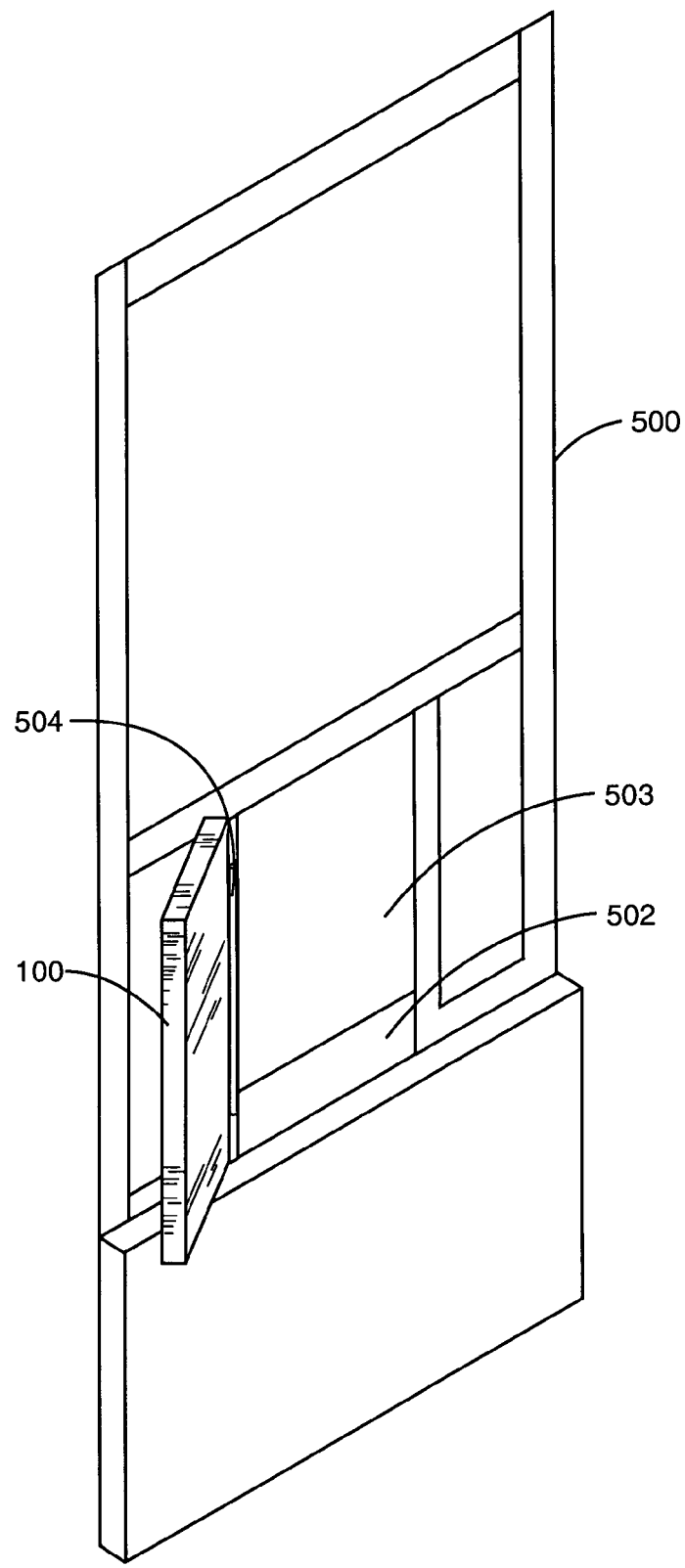
FIG. 8 is a schematic diagram of a drive-thru window having a payment mat positioned to the left of the window.

FIG. 8 also illustrates a drive-thru window 500, but the payment mat 100 is located on the left of the window 503. A hinge 504 connects the payment mat 100 to the window 503.

Figure 9:
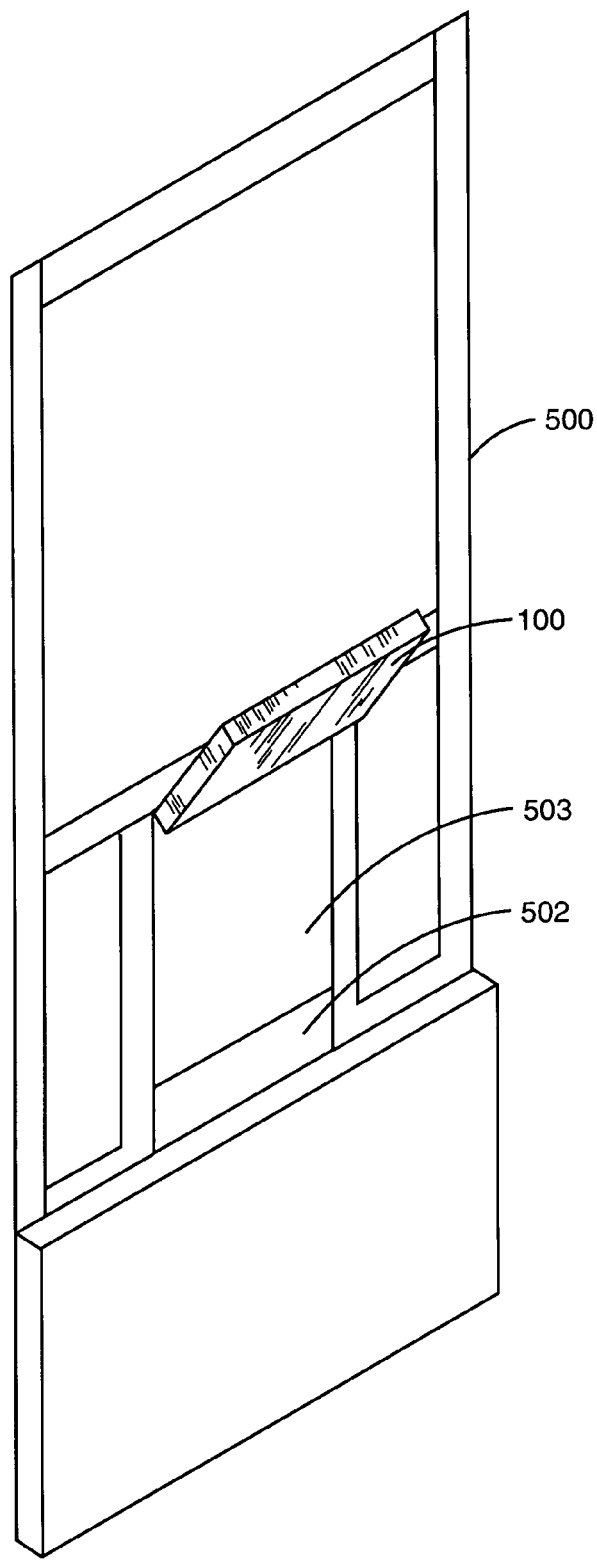
FIG. 9 is a schematic diagram of a drive-thru window having a payment mat positioned above the window.

FIG. 9 also illustrates a drive-thru window 500, but the payment mat 100 is located above the window 503. In this manner, a vehicle and/or customer is less likely to run into the payment mat 100, thereby potentially causing damage. However, the antenna 204 is farther away from the customer. This may still be operable if the antenna 204 is capable of radiating a field 208 of a sufficient length to reach the customer's payment device 300.

Figure 10:
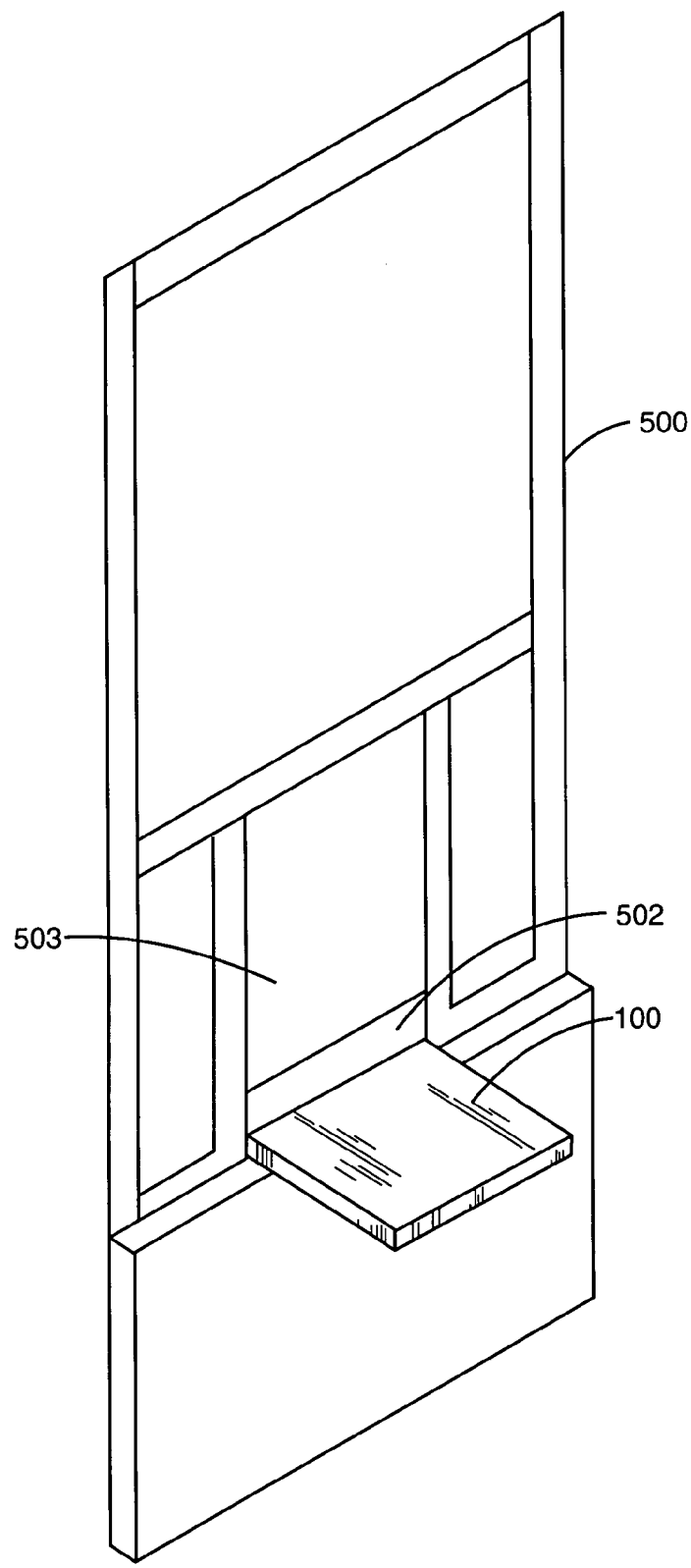
FIG. 10 is a schematic diagram of a drive-thru window having a payment mat positioned below the window.

FIG. 10 also illustrates a drive-thru window 500, but the payment mat 100 is located below the window 503.

Figure 11:
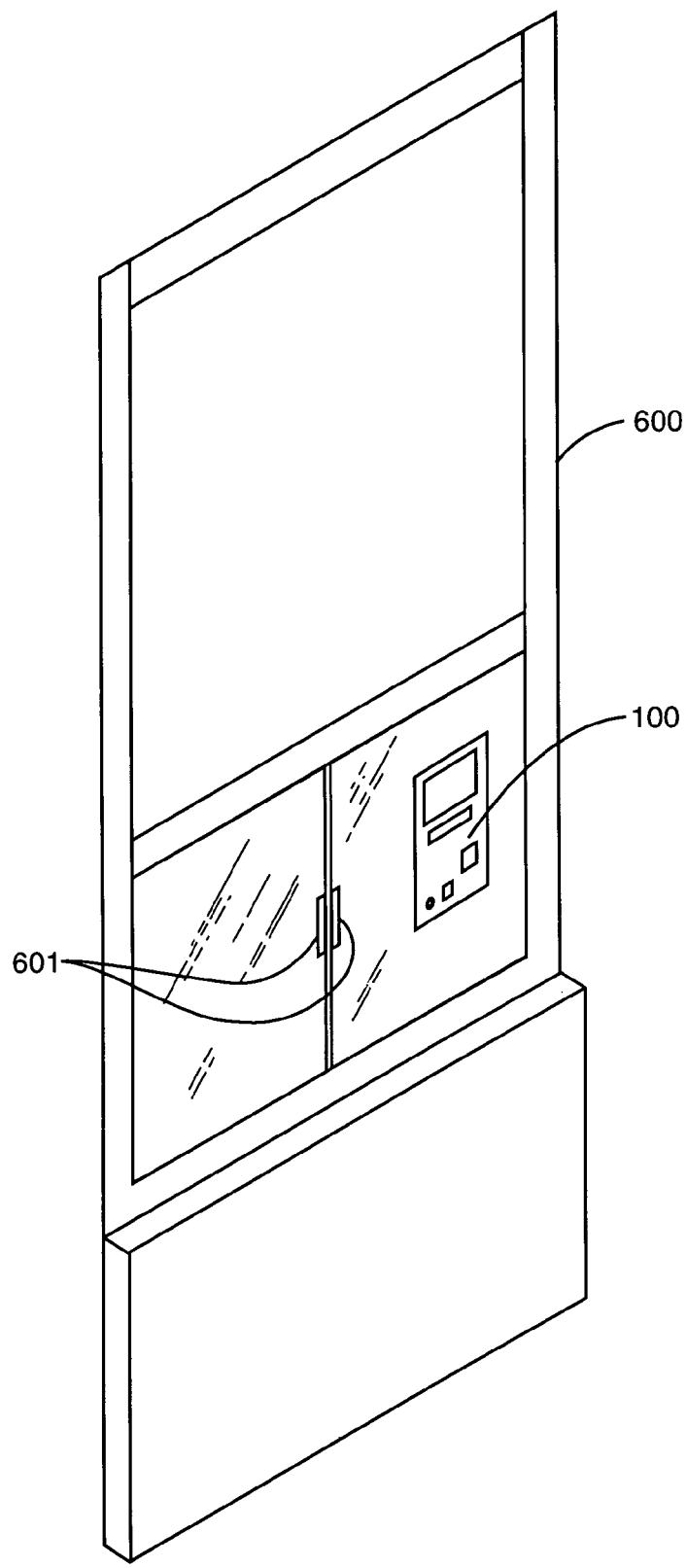
FIG. 11 is a schematic diagram of a secure order entry window inside a convenience store having a payment located behind the window.

FIG. 11 illustrates a secure order entry window 600 that is often found in convenience stores. The secure order entry window 600 is usually made out of a bullet-proof glass or other material, so that robbers cannot shoot through the window 600. An attendant is present on one side of the window 600, and the customer on the other side. The window 600 may also contain internal door locks 601, so that the window 600 can be opened and closed as the attendant sees fit. These windows 600 have a small portion or opening, whereby payment can be passed from the customer to the attendant. However, with the present invention, there is no need for this opening. The payment mat 100 can be placed upright on a portion of the window 600. The customer presents a payment device 300 up to the window 600, and the antenna 204 field 208 radiates through the window 600 to interrogate the payment device 300 for payment.

The embodiments described in this application are representative of the invention and are not intended to limit the invention to any particular embodiment. One of ordinary skill in the art will recognize that there are many ways to construct payment mats that include an antenna, and possible other electronic devices, for interrogation of payment devices and for other purposes, as described above. Use of particular terms, including the ones described above, should not be used to limit the scope of the embodiments and the present application from what one of ordinary skill in the art would understand them to mean and their equivalents to be.

What is claimed is:

1. A device for wirelessly communicating with a payment device for payment of items in a retail environment, comprising:
    a payment mat that is substantially flat and contains a dielectric, said payment mat comprised of a lower portion and an upper portion sealed together, wherein said lower portion has a front side and a back side, whereby said front side is sealed with said upper portion and said back side is comprised of a skid resistant surface; and
    an antenna contained in said payment mat and located on one side of said dielectric wherein said payment mat is associated with the retail environment and adapted to accept payment from a customer for the purchase of a good or service available in the retail environment.

2. The device of claim 1, wherein said payment mat is constructed out of a rigid material.

3. The device of claim 2, wherein said rigid material is comprised from the group consisting of plastic, metal, wood, marble, and foam.

4. The device of claim 1, wherein said payment mat is constructed out of a flexible material.

5. The device of claim 4, wherein said flexible material is resilient.

6. The device of claim 4, wherein said flexible material is comprised from the group consisting of plastic, cellular rubber, and foam.

7. The device of claim 1, wherein said antenna is a coil.

8. The device of claim 7, wherein said coil is helical.

9. The device of claim 1, wherein said antenna comprises a plurality of antennas designed to operate at different frequencies.

10. The device of claim 1, wherein said antenna is comprised of a printed conductive ink.

11. The device of claim 1, wherein said antenna is contained on a printed circuit board.

12. The device of claim 11, wherein said printed circuit board is flexible.

13. The device of claim 1, wherein said payment mat further comprises a transaction display.

14. The device of claim 13, wherein said transaction display is selected from the group consisting of a payment display, customer prompts, customer instructions, and items display.

15. The device of claim 1, wherein said payment mat further comprises an audio indicator.

16. The device of claim 1, wherein said payment mat further comprises a keypad.

17. The device of claim 16, wherein said keypad further comprises encryption circuitry to encrypt key sequences entered by the customer.

18. The device of claim 1, wherein said payment mat further comprises an advertising display to display advertisements to the customer.

19. The device of claim 1, wherein said payment mat further includes a card reader so that the payment mat is capable of receiving payment from the customer in a first mode from said payment device and is capable of receiving payment from the customer in a second mode from said card reader.

20. The device of claim 19, wherein said card reader is a magnetic stripe card reader.

21. The device of claim 1, wherein said payment mat further comprises a biometric reader to authenticate the customer in relation to the payment device.

22. A wireless payment system for payment of items in a retail environment, comprising:
    a transaction terminal within the retail environment;
    a payment mat associated with the retail environment and adapted to accept payments from customers of the retail environment for the purchase of a good or service available from the retail environment, said payment mat is substantially flat and contains a dielectric wherein said payment mat contains an antenna on one side of said dielectric wherein said payment mat is comprised of a lower portion and an upper portion sealed together, and said lower portion has a front side and a back side, whereby said front side is sealed with said upper portion and said back side is comprised out of a skid resistant surface;
    an interrogation reader coupled to said antenna; and
    said interrogation reader communicates with a payment device for payment of the items.

23. The wireless payment system of claim 22, wherein said payment mat further comprises a visual indicator to indicate when said payment device is in communication range of said antenna.

24. The wireless payment system of claim 23, wherein said visual indicator is selected from the group consisting of a LED, LCD shutter, light bulb, electro-luminescence panel, flat panel LCD, and woven fiber optic light.

25. The wireless payment system of claim 22, wherein an audio indicator indicates when said payment device is in communication range of said antenna.

26. The wireless payment system of claim 25, wherein said audio indicator gives the customer instructions.

27. The wireless payment system of claim 22, wherein said interrogation reader is coupled to said antenna through a cable wire.

28. The wireless payment system of claim 22, wherein said interrogation reader is coupled to said antenna through optical communication.

29. The wireless payment system of claim 22, wherein said interrogation reader is coupled to said antenna through radio-frequency communication.

30. The wireless payment system of claim 22, wherein said interrogation reader is capable of communicating at a plurality of different frequencies.

31. The wireless payment system of claim 22, wherein said interrogation reader is capable of communication at a plurality of different communication protocols.

32. The wireless payment system of claim 22, wherein said interrogation reader communicates at a frequency selected from the group consisting of 13.56 kHz, 134 kHz, 915 MHz, and 2.45 GHz.

33. The wireless payment system of claim 22, wherein said payment device is a RFID.

34. The wireless payment system of claim 22, wherein said payment device is a transponder.

35. The wireless payment system of claim 22, wherein said payment device contains memory.

36. The wireless payment system of claim 35, wherein said memory is used to store loyalty points.

37. The wireless payment system of claim 35, wherein said memory is used to store a cash balance for payment of the items.

38. The wireless payment system of claim 37, wherein said interrogation reader subtracts an amount from said cash balance on said payment device for payment of the items.

39. The wireless payment system of claim 22, wherein said interrogation reader interrogates a customer identification from said payment device to charge an account associated with said customer identification for payment of the items.

40. A device for wirelessly communicating with a payment device for payment of items in a retail environment, comprising:
  a payment mat adapted to accept payment from a customer within the retail environment for the purchase of a good or service sold within the retail environment, said payment mat comprising a substantially flat body adapted to be mounted within the retail environment and a dielectric; and
  an antenna positioned within said substantially flat body and adapted to communicate wirelessly with the payment device so as to facilitate acceptance of the payment.

* * * * *